United States Patent
Tsukagoshi

(10) Patent No.: US 8,894,220 B2
(45) Date of Patent: Nov. 25, 2014

(54) PROJECTION-TYPE DISPLAY DEVICE AND IMAGE QUALITY ADJUSTMENT AND FOCUS ADJUSTMENT CONTROL METHODS FOR THE SAME

(75) Inventor: Shinichi Tsukagoshi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 343 days.

(21) Appl. No.: 13/281,711

(22) Filed: Oct. 26, 2011

(65) Prior Publication Data
US 2012/0106922 A1  May 3, 2012

(30) Foreign Application Priority Data
Oct. 27, 2010  (JP) ................................. 2010-240488

(51) Int. Cl.
| | | |
|---|---|---|
| G03B 21/14 | (2006.01) | |
| H04N 9/31 | (2006.01) | |
| G03B 21/53 | (2006.01) | |
| G09G 3/00 | (2006.01) | |

(52) U.S. Cl.
CPC ........ *G03B 21/142* (2013.01); *G09G 2320/066* (2013.01); *H04N 9/3182* (2013.01); *G09G 2320/0606* (2013.01); *G09G 3/002* (2013.01); *G03B 21/53* (2013.01); *G09G 2320/08* (2013.01)
USPC ....................................................... 353/101

(58) Field of Classification Search
CPC ........................... H04N 9/3179; H04N 9/3182
USPC .................... 353/101; 348/739–771
See application file for complete search history.

(56) References Cited

U.S. PATENT DOCUMENTS

| | | | | |
|---|---|---|---|---|
| 5,523,802 | A * | 6/1996 | Sugihara et al. ............... | 348/743 |
| 6,371,616 | B1 | 4/2002 | Doany et al. | |
| 2004/0066392 | A1* | 4/2004 | Ueda .............................. | 345/629 |
| 2006/0285089 | A1 | 12/2006 | Higashi | |
| 2007/0013965 | A1 | 1/2007 | Iwanaga | |
| 2007/0247544 | A1* | 10/2007 | Imamura ........................ | 348/366 |
| 2007/0260988 | A1 | 11/2007 | Miller | |
| 2007/0279603 | A1* | 12/2007 | Akutsu ........................ | 353/122 |
| 2008/0051135 | A1 | 2/2008 | Destain et al. | |
| 2009/0040472 | A1* | 2/2009 | Wakita ............................ | 353/69 |
| 2009/0051816 | A1* | 2/2009 | Ota ................................ | 348/618 |
| 2009/0268172 | A1 | 10/2009 | Ke | |
| 2009/0322797 | A1 | 12/2009 | Tokui | |
| 2011/0043765 | A1 | 2/2011 | Shibasaki | |
| 2011/0128440 | A1* | 6/2011 | Koike .......................... | 348/441 |

FOREIGN PATENT DOCUMENTS

| | | |
|---|---|---|
| CN | 1296192 A | 5/2001 |
| CN | 101067923 A | 11/2007 |
| EP | 1734404 | 12/2006 |
| EP | 2290443 | 3/2011 |
| JP | 2598557 B | 4/1997 |
| TW | 2007-12731 A | 4/2007 |
| TW | 2008-19899 A | 5/2008 |

OTHER PUBLICATIONS

European Search Report, Feb. 15, 2012, issued in related Patent Application No. EP-11186668.

* cited by examiner

*Primary Examiner* — Thanh Luu
*Assistant Examiner* — Danell L Owens
(74) *Attorney, Agent, or Firm* — ALG Intellectual Property, LLC

(57) ABSTRACT

In the case of performing focus adjustment, image quality control is performed to set to relatively a high-contrast sense color mode of plural color modes that enable to set according to an environment at the time of projection.

12 Claims, 5 Drawing Sheets

| | DYNAMIC | LIVING | NATURAL | THEATER | x.v.color | ... |
|---|---|---|---|---|---|---|
| BRIGHTNESS | XXX (BRIGHT) | XXX (BRIGHT) | XXX (DARK) | XXX (DARK) | XXX | ... |
| CONTRAST | XXX (HIGH) | XXX (LOW) | XXX (LOW) | XXX (HIGH) | XXX | ... |
| SHARPNESS | XXX (HIGH) | XXX (LOW) | XXX (LOW) | XXX (HIGH) | XXX | ... |
| COLOR TONE | XXX | XXX | XXX | XXX | XXX | ... |
| ... | ... | ... | ... | ... | ... | ... |

FIG. 2

PROJECTION-TYPE DISPLAY DEVICE AND IMAGE QUALITY ADJUSTMENT AND FOCUS ADJUSTMENT CONTROL METHODS FOR THE SAME

The entire disclosure of Japanese Patent Application No. 2010-240488, filed Oct. 27, 2010 is expressly incorporated by reference herein.

BACKGROUND

1. Technical Field

The present invention relates to a projection-type display device and a control method for the same.

2. Related Art

In some projection-type display devices (projectors), a user operates a predetermined operator while viewing a projected image, thus performing focus adjustment of the projected image. Some of the projection-type display devices of this type have an electric focusing mechanism which electrically performs focus adjustment, and project a video of a focus adjustment pattern when an adjustment switch to actuate this mechanism is operated (see, for example, Japanese Patent No. 2,598,557).

However, with the foregoing configuration, the pattern dedicated for focus adjustment needs to be prepared and the data volume increases. Moreover, some users may wish to adjust the focus using an image for viewing which the user is to view actually without using the dedicated pattern, and the foregoing configuration cannot meet such demand.

Meanwhile, some of the projection-type display devices of this type have plural color modes that are set according to the environment at the time of projection, and thus can adjust the image quality of a projected image to a desired color mode. Such color modes include an image quality mode which emphasizes the atmosphere of a video rather than the sense of resolution of the video. If the image quality is adjusted to such a color mode, the sense of focus becomes less perceptible and focus adjustment becomes more difficult no matter which focus adjustment patter or image for viewing is used.

SUMMARY

An advantage of some aspects of the invention is to solve at least part of the problems described above and the invention can be implemented as the following forms or aspects.

An aspect of the invention is directed to a projection-type display device including: an image projection unit which projects an image; an image quality adjustment unit which adjusts image quality of the image to one of plural color modes that enable to set according to an environment at the time of projection; a focus adjustment unit which performs focus adjustment of the image; and a control unit which, in the case of performing the focus adjustment of the image, performs image quality control to set image quality of image projected by the image projection unit to a relatively high-contrast sense color mode of the plural color modes.

With this configuration, in the case of performing the focus adjustment of the image, image quality control is performed to set to the relatively high-contrast sense color mode of the plural color modes that are set according to the environment at the time of projection. Therefore, accurate focus adjustment can be made easily without using a dedicated pattern.

In the above configuration, the control unit, in the case of performing the focus adjustment, may perform image quality control to set to a highest-contrast sense color mode of the plural color modes. With this configuration, effective focus adjustment can be made easily using the existing color modes.

Moreover, in the above configuration, the image projection unit may project an image corresponding to a dynamic input image, and in the case of performing the focus adjustment of the image projected by a projection image projection unit, the control unit may perform display control to make the projection image still. With this configuration, a projected image with a greater sense of resolution can be provided than in the case where the projected image is displayed in the form of a dynamic image. Thus, more accurate focus adjustment can be made easily.

The above configuration may also have a communication unit which communicates with a video source device which supplies the image to the projection-type display device, and the control unit, in the case of performing the focus adjustment, may perform communication control to cause the video source device to pause reproduction of supplied image via the communication unit. With this configuration, a projected image with a greater sense of resolution can be provided than in the case where the projected image is displayed in the form of a dynamic image. Thus, more accurate focus adjustment can be made easily.

In the above configuration, comprising an operation unit that user's operation is input, the focus adjustment unit may have an electric focusing mechanism which electrically performs the focus adjustment in response to the user's operation. With this configuration, image quality control at the time of the focus adjustment can be carried out with effective use of the user's operation for focus adjustment, and increase in the number of components can be avoided.

Moreover, in the above configuration, each of the plural color modes may have different combination of values of brightness and contrast. With this configuration, image quality can be adjusted to high-contrast sense image quality by changing to a color mode with high brightness and contrast at the time of focus adjustment.

Another aspect of the invention is directed to a control method for a projection-type display device including an image projection unit which projects an image, and an image quality adjustment unit which adjusts image quality of the image to one of plural color modes that enable to set according to an environment at the time of projection and a focus adjustment unit which performs focus adjustment of the image. The method includes projecting the image by the image projection unit, and performing image quality control to set image quality of image to a relatively high-contrast sense color mode of the plural color modes.

According to the above aspects of the invention, accurate focus adjustment can be made easily without using a dedicated pattern.

BRIEF DESCRIPTION OF THE DRAWINGS

The invention will be described with reference to the accompanying drawings, wherein like numbers reference like elements.

FIG. 2 illustrates color modes of the projector.

DESCRIPTION OF EXEMPLARY EMBODIMENTS

Hereinafter, an embodiment of the invention will be described with reference to the drawings.

Figure 1:
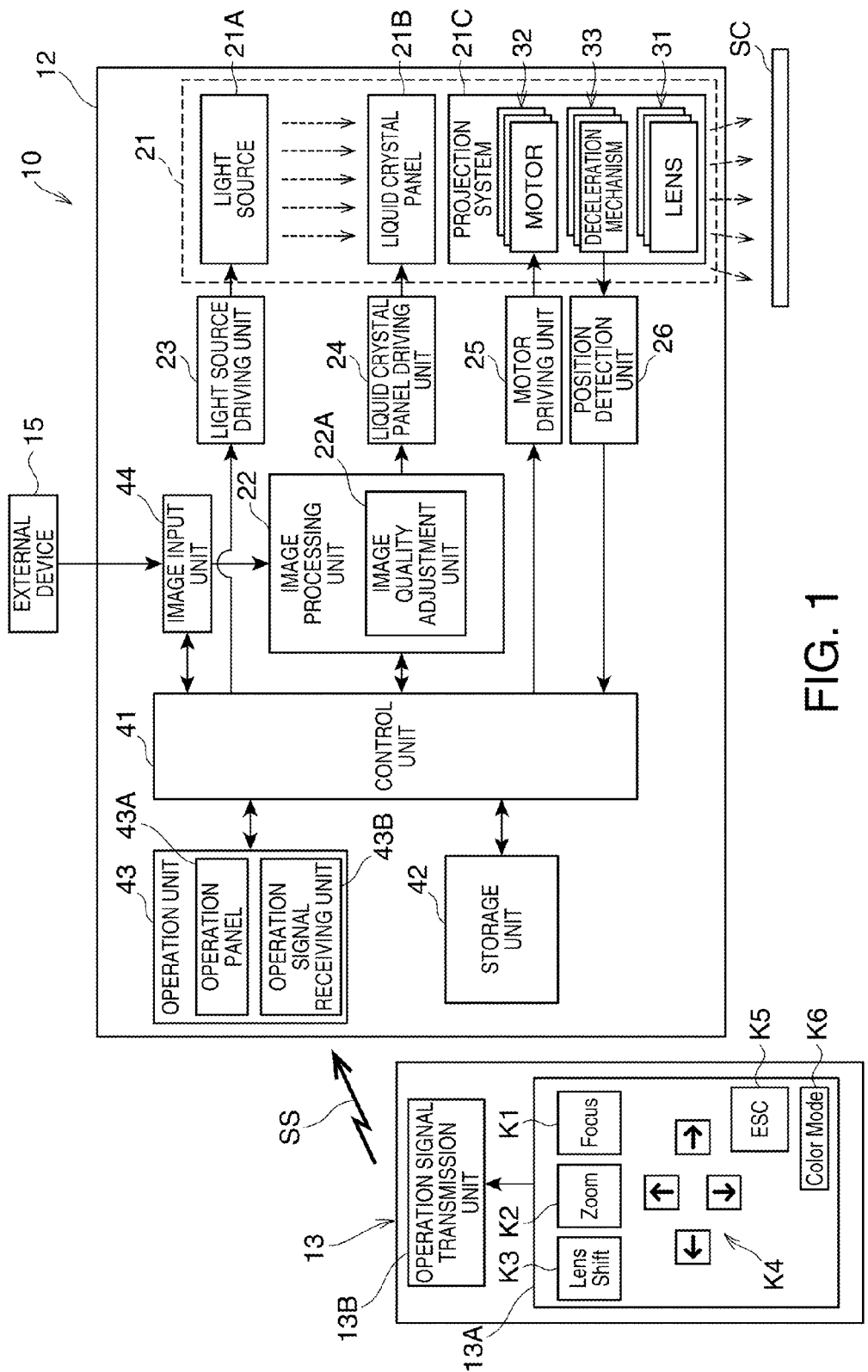
FIG. 1 is a block diagram of a projector according to an embodiment of the invention.

FIG. 1 is a block diagram of a projector (projection-type display device) 10 according to an embodiment of the invention.

This projector 10 is a device which projects image light representing an image and thus displays the image (projected image) on a screen SC as a projection surface. The projector 10 has a device body 12 accommodating main components, and a remote controller 13 which a user holds and thus can operate the projector 10.

In the device body 12, an image projection unit 21 constituting an optical system and an image processing unit 22 constituting an image processing system are mainly arranged.

The image projection unit 21 constitutes an optical system which projects an image toward the screen SC, and includes a light source 21A functioning as a light source, a liquid crystal panel (also referred to as a liquid crystal light valve) 21B, and a projection system 21C.

The light source 21A has a xenon lamp, ultra-high pressure mercury lamp, LED (light emitting diode) or the like, and is driven by a light source driving unit 23 to emit illuminating light. The liquid crystal panel 21B is a transmission-type liquid crystal panel in which plural pixels are arranged in the form of a matrix. As the liquid crystal panel 21B is driven by a liquid crystal panel driving unit 24, the light transmittance of each pixel is changed and the illuminating light from the light source 21A is thus modulated to image light that represents an image.

The projection system 21C enlarges the light that is modulated to the image light by the liquid crystal panel 21B and projects this enlarged light. In the projection system 21C, plural lenses (electric lenses) 31 for enlargement and reduction of the projected image, focus adjustment, and lens shift, motors (electric motors) 32 to drive each lens 31, and deceleration mechanisms 33 which decelerate the rotation of each electric motor 32 in driving each lens 31.

A motor driving unit 25 electrically drives each motor of the projection system 21C, thus carrying out enlargement and reduction of the projected image, focus adjustment, and lens shift.

That is, in this projector 10, the lenses 31, the motors 32 and the deceleration mechanisms 33 constitute an electric zooming mechanism, an electric focusing mechanism (focus adjustment unit), and an electric lens shift mechanism.

A position detection unit 26 is an encoder which detects the driving position of each lens 31, that is, each of the current zooming position, focusing position and lens shift position, and is mechanically connected with the deceleration mechanisms 33.

Here, in the case where the projector 10 is formed as a 3-LCD projector, three liquid crystal panels 21B corresponding to the three colors of R, G and B, and mirrors and prisms which separate and combine light from the light source 21A are arranged. In this embodiment, for convenience of explanation, the configuration is assumed to have a single liquid crystal panel 21B. A broad range of known configurations can be applied to this image projection unit 21.

Moreover, a control unit 41, a storage unit 42, an operation unit 43, an image input unit 44 and the like are provided in the device body 12 of the projector 10.

The control unit 41 executes a control program stored in the storage unit 42 and thus functions as a computer which controls each part of the projector 10. In this embodiment, the control unit 41 and the image processing unit 22 function as a display control unit which controls display on the liquid crystal panel 21B.

In the storage unit 42, the control program and various data are stored. In the storage unit 42, image quality parameter to prescribed plural color modes, which will be described later, is stored as well.

The operation unit 43 has an operation panel 43A having plural operators, and an operation signal receiving unit 43B which receives an operation signal SS transmitted from the remote controller 13. The operation unit 43 notifies the control unit 41 of user's operations via these units. The operators include a switch to designate power ON/OFF and the like.

The image input unit 44 receives an input of a video signal (input image) SA of a dynamic format from an external device (such as a personal computer or DVD player) 15 as a video source device connected to the device body 12 via a cable, and performs analog-digital conversion or the like.

The image processing unit 22 performs, in the form of digital processing, image processing such as processing to generate dynamic image data from a video signal (referred to as reproduction processing of input image) and IP conversion to convert the format of image data from an interlace format to a progressive format. On the basis of the digitally processed image data, the liquid crystal panel driving unit 24 drives the liquid crystal panel 21B and the corresponding image is projected.

The image processing unit 22 is provided with an image quality adjustment unit 22A which adjusts the image quality of an input image, as a digital processing unit.

The image quality adjustment unit 22A receives an input of image quality parameters (parameter set) prescribing a color mode from the control unit 41, and based on the image quality parameters, performs plural kinds of image quality adjustment on the image data, such as adjustment of brightness, contrast, sharpness and color tone, and gamma correction. Moreover, the control unit 41 adjusts the light source 21A and an aperture, not shown, based on "brightness" of the image quality parameters prescribing a color mode, and thus adjusts the projected image to one of the color modes.

A color mode is a setting item for setting brightness and color toner according to the environment at the time of projection. FIG. 2 shows each color mode.

The color modes include "dynamic" suitable for use in a bright environment, "living" suitable for use in an environment with illuminating light, "natural" in which an image that is true to an input image can be reproduced in a dark environment, "theater" suitable for viewing movies and concerts in a dark environment, "x.v.color" suitable for viewing input images compatible with x.v.color (trademark registered), and the like. Each color mode includes data of a parameter set describing the value of each parameter such as "brightness", "contrast", "sharpness" and "color tone", which are detail items of image quality.

As shown in the example of FIG. 2, generally, in the "dynamic" color mode, the parameter values of "brightness", "contrast" and "sharpness" are set to be high. Thus, adjustment is made to realize bright, high contrast and sharp image quality. A criterion for determining whether parameter values are high or low is whether these values are higher or lower than the parameter values of prescribed reference image quality (standard image quality), and also coincides with whether the parameter values are relatively higher or lower than the parameter values of the other color modes. Here, a contrast sense is image quality sense which a color mode including a combination of the parameter values of "brightness", "contrast" and "sharpness" indicates.

In the "living" color mode, the parameter value of "brightness" is set to be high and the parameter values of "contrast" and "sharpness" are set to be low. Thus, adjustment is made to realize bright image quality such that little or no contrast correction and sharpness correction is made.

In the "natural" color mode, the parameter values of "brightness", "contrast" and "sharpness" are set to be low. Thus, adjustment is made to realize dark image quality such that little or no contrast correction and sharpness correction is made.

In the "theater" color mode, the parameter value of "brightness" is set to be low and the parameter values of "contrast" and "sharpness" are set to be high. Thus, adjustment is made to realize dark, high-contrast and sharp image quality.

The parameters of each color mode may be partly different from the above parameters. However, in this embodiment, the "dynamic" color mode has an image quality parameter set that realizes the brightest, highest contrast and sharpest image quality. Namely, the "dynamic" color mode means the highest contrast sense color mode.

Next, the remote controller 13 will be described.

The remote controller 13 is constituted as a small remote controller which the user can hold and easily carry. The remote controller 13 has an operation panel 13A having plural operators, and an operation signal transmission unit 13B which transmits an operation signal SS that can be received by the operation signal receiving unit 43B of the projector 10.

On the operation panel 13A, a focus key (illustrated as "Focus") K1 to designate focus adjustment, a zoom key (illustrated as "Zoom") K2 to designate electronic zooming, a lens shift key (illustrated as "Lens Shift") K3 to designate lens shift, direction keys (illustrated with arrows) K4 to designate up, down, right and left directions, an escape key K5 to designate "Return", a color mode (illustrated as "Color Mode") K6 to designate set of color mode, and other operators, not shown, that an ordinary remote controller for a projector has, are arranged.

The operators, not shown, include a switch to designate power ON/OFF and the like. All the operators arranged on the remote controller 13 are constituted as press-type switches.

An outline of operations based on the remote-controlling of the projector 10 will be described.

In the projector 10, when the focus key K1 is pressed, the control unit 41 operates in a focus adjustment mode. In the focus adjustment mode, the focal length is changed by the motor driving unit 25 according to the operation of the left and right direction keys K4.

When the zoom key K2 is pressed, the control unit 41 operates in a zoom adjustment mode. In this mode, the projected image is enlarged or reduced by the motor driving unit 25 according to the operation of the up and down direction keys K4.

When the lens shift key K3 is pressed, the control unit 41 operates in a lens shift mode. In this mode, the projected image is moved up, down, left and right by the motor driving unit 25 according to the up, down, left and right direction keys K4.

In each of the above operation modes, when the escape key K5 is pressed, the normal operation mode is restored from each mode.

Every time the color mode key K6 is pressed, the control unit 41 displays a color mode name in the projected image for a predetermined time, and performs image quality control to set the color mode by the image quality adjustment unit 22A. In this case, the color mode is circularly switched in order of "dynamic"→"living"→"natural"→"theater"→"x.v. color"→ . . . "automatic".

Here, "automatic" is a state where a color mode is automatically selected according to the circumstances including the brightness of the surroundings. Since focus adjustment, zoom adjustment, lens shift, and color mode adjustment can be thus carried out via remote-controlling, the user can easily make each adjustment even where the projector 10 is installed at a position away from the user (for example, installed on the ceiling).

Hereinafter, detailed operations at the time of focus adjustment will be described.

Figure 3:
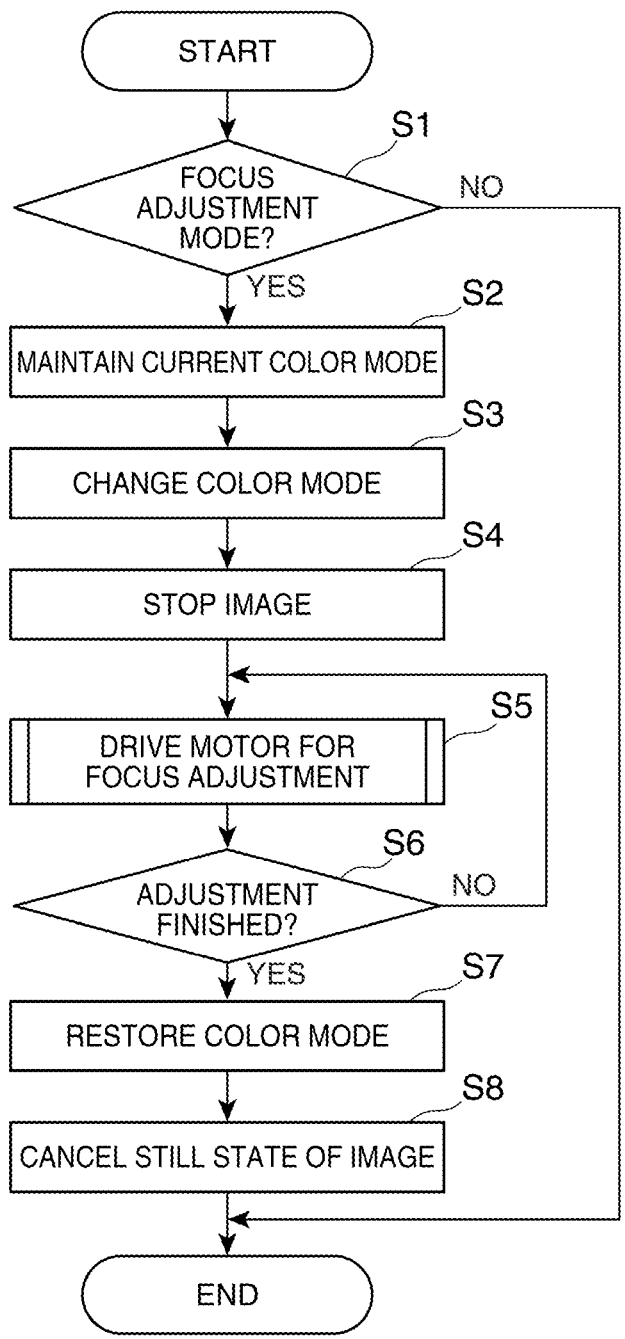
FIG. 3 is a flowchart showing operation at the time of focus adjustment.

FIG. 3 is a flowchart showing operations in this case. The processing shown in this flowchart is repeatedly executed in a predetermined interrupt cycle when the power of the projector 10 is ON.

First, the control unit 41 determines whether the current mode is the focus adjustment mode or not, that is to say whether the focus key K1 to designate focus adjustment is pressed or not (step S1). If the current mode is not the focus adjustment mode, this processing ends there. If the current mode is the focus adjustment mode (step S1: YES), the control unit 41 shifts to processing of step S2.

In step S2, the control unit 41 specifies the current color mode and saves information indicating the specified color mode (color mode specifying information) in the storage unit 42. When the color mode is the automatic mode, information specifying that the color mode is the automatic mode is saved as color mode specifying information.

Next, the control unit 41 performs image quality control to set the projected image to a predetermined color mode that satisfies a condition suitable for focus adjustment (step S3). Specifically, the control unit 41 instructs the image processing unit 22 to set to the predetermined color mode and causes the image quality adjustment unit 22A of the image processing unit 22 to adjust the image quality of the projected image to this color mode. Moreover, the control unit 41 causes the light source driving unit 23 to adjust the quantity of light of the light source 21A according to "brightness" in the above color mode. The quantity of light of the light source 21A may not be adjusted depending on the value of "brightness" in this color mode.

Here, the condition suitable for focus adjustment refers to adjusting the image quality to a high-contrast sense color mode, thus a color mode for image quality adjustment that provides this high-contrast sense is select. The high-contrast sense color mode is at least a color mode that parameter value of brightness is relatively high. Preferably, a color mode that both parameter value of brightness and parameter value of contrast or sharpness are relatively high is selected. Further preferably, a color mode that all parameter values of brightness, contrast, and sharpness are relatively high, that is the "dynamic" color mode which is the highest-contrast sense color mode is selected. In this embodiment, the control unit 41 performs image quality control to set to the "dynamic" color mode. In addition, in case that the current color mode specified in step S2 is "dynamic" color mode, it is not necessary for the control unit 41 to set "dynamic", shifting to processing of step S4.

Next, the control unit 41 performs display control to make the projected image still (step S4). Specifically, the control unit 41 instructs the image processing unit 22 to stop updating the projected image so that a still image obtained by stopping an input image is projected. Thus, a still image corresponding to an input image as of when the user presses the focus key K1 is projected. In other words, as the still image at the time of the focus adjustment mode, the user can select a still image which the user wishes to use for focus adjustment, by adjusting the timing of pressing the focus key K1.

Then, while holding this display state, the control unit 41 performs focus adjustment control to drive the motors 32 for focus adjustment in response to the focus adjustment operation on the remote controller 13, that is, the operation of the left and right direction keys K4, and thus changes the focal length (step S5).

Figure 4:
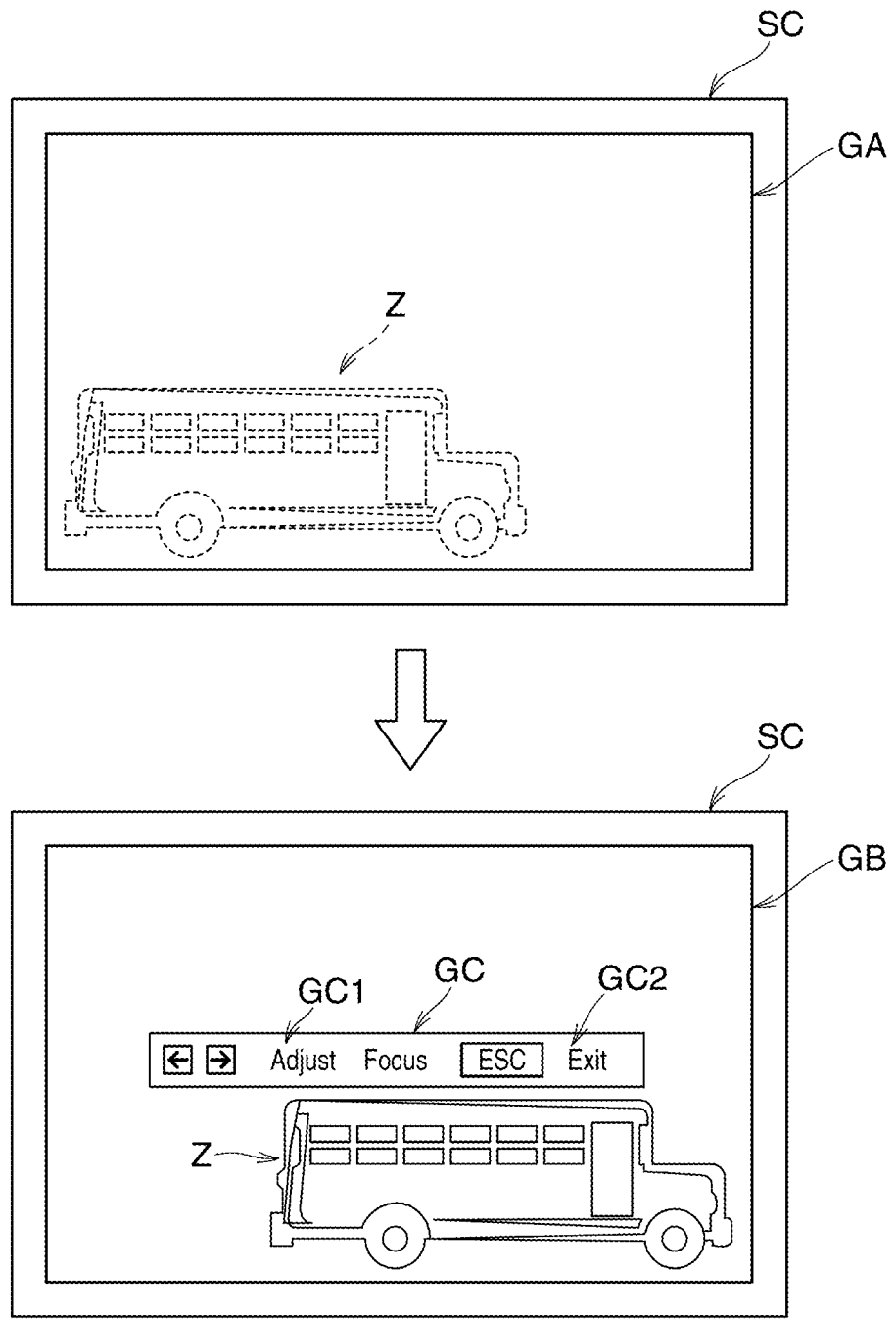
FIG. 4 shows an example of a projected image at the time of focus adjustment.

Now, FIG. 4 shows an example of a projected image in this case.

In FIG. 4, a projected image GA shown at the top is an image before shifting to the focus adjustment mode, showing a dynamic image of a vehicle Z moving to the right. A projected image GB shown at the bottom is an image after shifting to the focus adjustment mode.

As shown in FIG. 4, when a shift to the focus adjustment mode is made, the projected image GA is changed to the color mode of "dynamic". Therefore, the projected image GB after the shift is adjusted to a bright image on which contrast correction and sharpness correction are made, that is, an image with high contrast sense and a sense of resolution, compared with the projected image GA before the shift. Moreover, since the projected image changes to a still image, the sense of resolution of the projected image GB after the shift is higher than the dynamic projected image GA.

Therefore, the user can make focus adjustment while viewing the image with high contrast sense and a sense of resolution. Thus, the user can easily visually confirm whether the focus is accurately adjusted on the screen SC or not, and can accurately adjust the focus. Moreover, since focus adjustment is made using an image for viewing that the user actually views, focus adjustment that achieves a high level of satisfaction even to a user who pays much attention to focus adjustment can be performed.

In the projected image GB at the time of the focus adjustment mode, an operation guide screen GC showing an operation content of focus adjustment is displayed by the display control of the control unit 41, as shown in FIG. 4.

This operation guide screen GC is an image that continues to be displayed during the focus adjustment mode. In the screen GC, guide information showing the use of the direction keys K4 for focus adjustment (indicated by GC1 in FIG. 4), and guide information showing the use of the escape key K5 when exiting the focus adjustment mode (indicated by GC2 in FIG. 4) are displayed.

As this operation guide screen GC is displayed, the user can easily make focus adjustment without remembering the operation method for focus adjustment.

In the focus adjustment mode, when the escape key K5 is pressed, the control unit 41 performs operation mode restoration control to restore the operation state immediately preceding the focus adjustment mode. Specifically, when the escape key K5 is pressed, the control unit 41 determines that focus adjustment is finished (Step S6: YES), and performs display control to restore the color mode preceding the focus adjustment mode on the basis of the color mode specifying information saved in the storage unit 42 (step S7) and display control to cancel the still state of the image (step S8), as shown in FIG. 3. The operation at the time of focus adjustment is carried out as described above.

As explained above, in this embodiment, the control unit 41, in the case of performing focus adjustment, performs image quality control to change to a high-contrast sense color mode of plural color modes that are set according to the environment at the time of projection. Therefore, the user can easily visually confirm whether the focus is adjusted or not, and can easily adjust the focus. Thus, focus adjustment can be easily made with effective use of the existing color modes and accurate focus adjustment can be performed without using a dedicated pattern for focus adjustment.

Moreover, the control unit 41, in the case of performing focus adjustment, performs image quality control to change to the "dynamic" color mode, which is the highest-contrast sense color mode. Therefore, effective focus adjustment can be made easily. In addition, since this "dynamic" color mode is a color mode suitable for the use in a bright environment and a color mode provided in a general projector, there is no need to prepare special color modes.

Furthermore, the control unit 41 performs display control to stop the projected image to still state, in the case of performing focus adjustment. Therefore, a projected image with a greater sense of resolution can be provided from the same video source, than in the case of displaying the projected image as a dynamic image. Thus, more accurate focus adjustment can be made easily.

Since the projector 10 has a configuration having an electric focusing mechanism as described above, in the case of performing focus adjustment, operators to be operated by the user exist necessarily. In this configuration, image quality control is performed to change to the color mode in response to the operation of the focus key K1 used for this focus adjustment. Therefore, image quality control at the time of focus adjustment can be performed with effective use of the existing operators. In this case, since there is no need to provide separate operators, increase in the number of components can be avoided.

The above embodiment describes only an example of carrying out the invention. Modifications and application can be made arbitrarily without departing from the scope of the invention.

For example, in the above embodiment, the case of changing to the "dynamic" color mode at the time of focus adjustment is described. However, the color mode is not limited to this. If a high-contrast sense color mode is provided other than "dynamic", the image may also be changed to that color mode.

In the above embodiment, the case of carrying display control to stop a projected image to still state at the time of focus adjustment is described. However, without being limited to this, this display control may be omitted. Since the projected image can be provided with high contrast sense by changing the color mode without performing this display control, accurate focus adjustment can be thus made easily.

In the above embodiment, the case of performing display control of the image processing unit 22 to stop a projected image to still state at the time of focus adjustment is described. However, display control is not limited to this.

For example, in the case where the external device (video source device) 15 and the projector 10 are connected to HDMI (High-Definition Multimedia Interface (trademark registered)), the external device (video source device) 15 and the projector 10 can communicate with each other.

Figure 5:
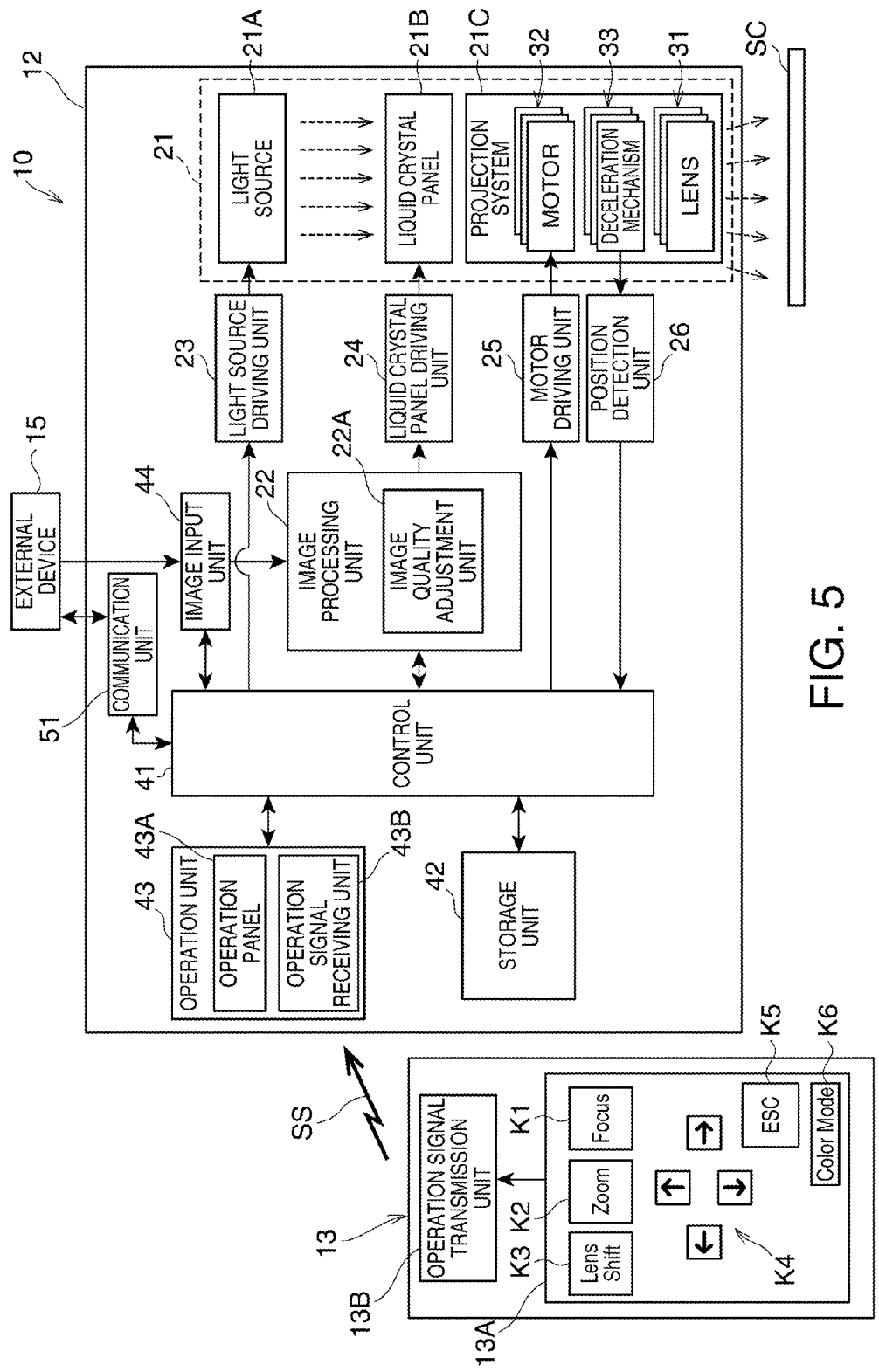
FIG. 5 illustrates a modified example.

That is, with this HDMI connection, as shown in FIG. 5, a communication unit 51 communicating with the external device 15 is provided within the projector 10, and the operation of the external device 15 can be controlled by a command transmission or the like from the projector 10 side to the external device 15 via the communication unit 51.

In this case, at the time of focus adjustment, the control unit 41 may perform communication control (command transmission) to cause the external device 15 to pause image reproduction via the communication unit 51, instead of the technique of performing display control of the image processing unit 22 to stop the projected image to still state. By this, too, the projected image can be provided as a still image and more accurate focus adjustment can be made easily. Moreover, since the configuration essential to the HDMI connection is used, increase in the number of components can be avoided.

Furthermore, if the control unit 41 performs communication control to designate image production via the communication unit 51 when focus adjustment is finished, the subsequent image can be projected immediately after the completion of focus adjustment, and the user can resume viewing the image easily and immediately.

In the above embodiment, a dedicated color mode for focus adjustment may be provided, and at the time of focus adjustment, the control unit 41 may perform image quality control to change to this dedicated color mode for focus adjustment. Moreover, in addition to image quality control to change the color mode at the time of focus adjustment, further image quality adjustment may be carried out to increase brightness, contrast, sharpness, color tone and the like in the color mode after the change.

Also, while the above projector 10 is a type that projects an image on a screen using a transmission-type liquid crystal panel 21B, a projector using a reflection-type liquid crystal panel, or a DMD-type projector using a digital mirror device may also be employed. Moreover, the invention can be applied not only to the projector which projects a color image using a single liquid crystal panel 21B, but also to any of a 3LCD-type projector which projects a color image using three liquid crystal panels 21B, a single-panel DMD-type projector having a color wheel, and a 3DMD-type projector.

Furthermore, each functional unit of the above projector 10 represents the functional configuration of the projector 10 and is not particularly limited to a specific installation form. That is, separate hardware corresponding to each functional unit need not necessarily be installed. As a matter of course, a configuration in which one processor realizes plural functional units by executing a program can also be employed. Functions realized by software in the embodiment may be partly realized by hardware. Alternatively, functions realized by hardware may be partly realized by software. Moreover, the specific details of the configuration of the projector 10 can be changed arbitrarily without departing from the scope of the invention. The invention can also be implemented as a program executed by such a device.

What is claimed is:

1. A projection-type display device comprising:
   an image projection unit which projects an image;
   an image quality adjustment unit which adjusts an image quality of the image to a color mode included in a plurality of color modes enabled to be set according to an environment at the time of projection;
   a focus adjustment unit which performs focus adjustment of the image; and
   a control unit which
      when performing the focus adjustment of the image, performs image quality control to set the image quality of the image projected by the image projection unit to a relatively high-contrast sense color mode included in the plurality of color modes, and
      performs image quality control to restore the image quality of the image to the color mode immediately preceding the performing of the focus adjustment of the image,
   wherein each of the plurality of color modes includes data describing a value of each of a plurality of image quality parameters, the plurality of image quality parameters comprising brightness, contrast, and sharpness, and
   wherein the relatively high-contrast sense color mode comprises a color mode included in the plurality of color modes having a value of at least one of the plurality of image quality parameters that is higher than a value of the at least one of the image quality parameters of at least one of the other color modes included in the plurality of color modes.

2. The projection-type display device according to claim 1, wherein the relatively high-contrast sense color mode comprises a highest-contrast sense color mode of the plurality of color modes.

3. The projection-type display device according to claim 2, wherein the highest-contrast sense color mode comprises a color mode in which all values of brightness, contrast, and sharpness are higher than the values of brightness, contrast, and sharpness of the other color modes included in the plurality of modes.

4. The projection-type display device according to claim 1, wherein
   the image projection unit projects an image corresponding to a dynamic input image, and
   in the case of performing the focus adjustment of the image projected by a projection image projection unit, the control unit performs display control to make the projection image still.

5. The projection-type display device according to claim 1, further comprising a communication unit which communicates with a video source device which supplies the image to the projection-type display device,
   wherein the control unit, in the case of performing the focus adjustment, performs communication control to cause the video source device to pause reproduction of supplied image via the communication unit.

6. The projection-type display device according to claim 1, further comprising an operation unit that receives input of a user's operation,
   wherein the focus adjustment unit has an electric focusing mechanism which electrically performs the focus adjustment in response to the user's operation.

7. The projection-type display device according to claim 1, wherein each color mode included in the plurality of color modes has a different combination of values of brightness and contrast.

8. The projection-type display device according to claim 1, wherein the relatively high-contrast sense color mode has a relatively high value of the brightness image quality parameter.

9. The projection-type display device according to claim 8, wherein the relatively high-contrast sense color mode further has a relatively high value of at least one of the contrast image quality parameter and sharpness image quality parameter.

10. The projection-type display device according to claim 1, wherein each of the plurality of color modes has a different combination of the values of the brightness image quality parameter and at least one of the contrast image quality parameter and the sharpness image quality parameter.

11. A control method for a projection-type display device including an image projection unit which projects an image, an image quality adjustment unit which adjusts an image quality of the image to a color mode included in a plurality of color modes enabled to be set according to an environment at the time of projection, each of the plurality of color modes including data describing a value of each of a plurality of image quality parameters, and a focus adjustment unit which performs focus adjustment of the image, comprising the steps of:
   projecting the image by the image projection unit,
   performing focus adjustment of the image, when performing the focus adjustment of the image, performing image quality control to set the image quality of the image to a relatively high-contrast sense color mode included in the plurality of color modes, and performing image quality control to restore the image quality of the image to the color mode immediately preceding the performing of the focus adjustment of the image, wherein the relatively high-contrast sense color mode comprises a color mode included in the plurality of color modes having a value of at least one of the plurality of image quality parameters that is higher than a value of the at least one of the image quality parameters of at least another color mode included in the plurality of color modes.

12. The control method according to claim 11, wherein the plurality of image quality parameters includes brightness, contrast, and sharpness.

* * * * *